United States Patent
Zillmer et al.

(10) Patent No.: US 8,327,839 B2
(45) Date of Patent: Dec. 11, 2012

(54) AIR INSTRUMENTATION SYSTEM FOR CONCENTRATED SOLAR POWER GENERATION SYSTEMS

(75) Inventors: Andrew J. Zillmer, Woodland Hills, CA (US); Joseph P. Carroll, Moorpark, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 904 days.

(21) Appl. No.: 12/349,887

(22) Filed: Jan. 7, 2009

(65) Prior Publication Data
US 2010/0170498 A1    Jul. 8, 2010

(51) Int. Cl.
*F24J 2/40* (2006.01)
*F24J 2/00* (2006.01)
*G01J 3/42* (2006.01)
*G01J 3/28* (2006.01)
*G01J 3/18* (2006.01)
*F03G 6/00* (2006.01)

(52) U.S. Cl. ........ 126/583; 126/569; 356/320; 356/328; 356/334; 60/641.11; 60/641.15

(58) Field of Classification Search ................ 126/583; 356/320, 328, 334
See application file for complete search history.

(56) References Cited

U.S. PATENT DOCUMENTS

| | | | |
|---|---|---|---|
| 3,836,237 A * | 9/1974 | Egan et al. | 359/894 |
| 4,549,080 A * | 10/1985 | Baskins et al. | 250/343 |
| 4,584,428 A | 4/1986 | Garlick | |
| 5,606,413 A | 2/1997 | Bellus et al. | |
| 6,557,804 B1 | 5/2003 | Carroll | |
| 6,701,711 B1 | 3/2004 | Litwin | |
| 6,877,508 B2 | 4/2005 | Litwin | |
| 6,886,339 B2 | 5/2005 | Carroll et al. | |
| 6,931,851 B2 | 8/2005 | Litwin | |
| 6,957,536 B2 | 10/2005 | Litwin et al. | |
| 7,138,960 B2 | 11/2006 | Carroll et al. | |
| 7,173,179 B2 | 2/2007 | Nicoletti et al. | |
| 7,229,833 B1 * | 6/2007 | Andersson | 436/73 |
| 2005/0109387 A1 * | 5/2005 | Marshall | 136/253 |
| 2007/0251569 A1 | 11/2007 | Shan et al. | |
| 2008/0000231 A1 | 1/2008 | Litwin et al. | |
| 2008/0271776 A1 | 11/2008 | Morgan | |
| 2010/0028725 A1 * | 2/2010 | Zillmer et al. | 429/12 |

OTHER PUBLICATIONS

Zillmer, Andrew J., Fuel Cell Instrumentation System, U.S. Appl. No. 11/744,229, filed May 4, 2007.
Litwin, Robert et al., Supercritical CO2 Turbine for Use in Solar Power Plants, U.S. Appl. No. 11/636,247, filed Dec. 8, 2006.
Carroll, Joseph P., Dual-Function Stirling Engine System, U.S. Appl. No. 11/500,117, filed Aug. 7, 2006.

* cited by examiner

*Primary Examiner* — Kenneth Rinehart
*Assistant Examiner* — William Corboy
(74) *Attorney, Agent, or Firm* — Kinney & Lange, P.A.

(57) ABSTRACT

An air quality instrumentation system for a concentrated solar power generation system using a fluid heat transfer medium includes a pipe, a window and a spectroscope. The pipe extends from the concentrated solar power generation system and contains system air from within the concentrated solar power generation system. The window is positioned within the pipe to permit light to pass through the pipe and the system air. The spectroscope is positioned adjacent the window to assess concentration of a constituent within the system air, the concentration of the constituent providing an indication of an operating condition of the concentrated solar power generation system.

20 Claims, 3 Drawing Sheets

AIR INSTRUMENTATION SYSTEM FOR CONCENTRATED SOLAR POWER GENERATION SYSTEMS

CROSS-REFERENCE TO RELATED APPLICATION(S)

The present application is related to the following co-pending applications filed on the same day as this application: "AIR DRYING SYSTEM FOR CONCENTRATED SOLAR POWER GENERATION SYSTEMS" by inventors A. Zillmer and D. Cap (U.S. patent application Ser. No. 12/349,838.

BACKGROUND

The present invention relates to instrumentation systems for solar power generation systems and, more particularly, to air quality instrumentation systems for concentrated solar power generation systems.

Throughout the world there is an increasing demand for energy, which is typically provided by fossil fuels such as petroleum and coal. Additionally, due to scarcity and adverse environmental effects of fossil fuels, cleaner, renewable energy sources are becoming more desirable. As technology advances, alternative fuel sources are becoming feasible to replace, or at least augment, conventional power plants to meet worldwide energy demand in a clean manner. In particular, solar energy is freely available and is becoming more feasible, especially in the form of concentrated solar power, which allows for energy storage and can be scaled for commercial production.

Concentrated solar power generation systems typically comprise solar collectors that focus solar rays onto a heat transfer medium such as a molten salt. For example, solar power towers use an array of thousands of heliostats to concentrate energy on an elevated central receiver through which molten salt flows inside of numerous pipes. In solar trough systems, molten salt flows through extended lengths of piping which are shrouded by solar collecting troughs that concentrate energy along lengths of the pipes. Heat from the solar energy is transferred to the molten salt and then through a heat exchanger to another medium, such as air or water, which is then used to generate mechanical energy that is ultimately converted to electrical power. Molten salt efficiently stores heat from the solar energy for extended periods of time such that electrical power can be generated at night or during other periods of low solar collection. Concentrated solar power generation systems are, however, typically vented to the atmosphere and are, as such, open to receiving moisture and debris from the surrounding environment. There is, therefore, a need for understanding and improving air quality within solar power generation systems.

SUMMARY

The present invention is directed to an air quality instrumentation system for use in a concentrated solar power generation system using a fluid heat transfer medium. The air quality instrumentation system includes a pipe, a window and a spectroscope. The pipe extends from the concentrated solar power generation system and contains system air from within the concentrated solar power generation system. The window is positioned within the pipe to permit light to pass through the pipe and the system air. The spectroscope is positioned adjacent the window to assess concentration of a constituent within the system air, the concentration of the constituent providing an indication of an operating condition of the concentrated solar power generation system.

DETAILED DESCRIPTION

Figure 1:
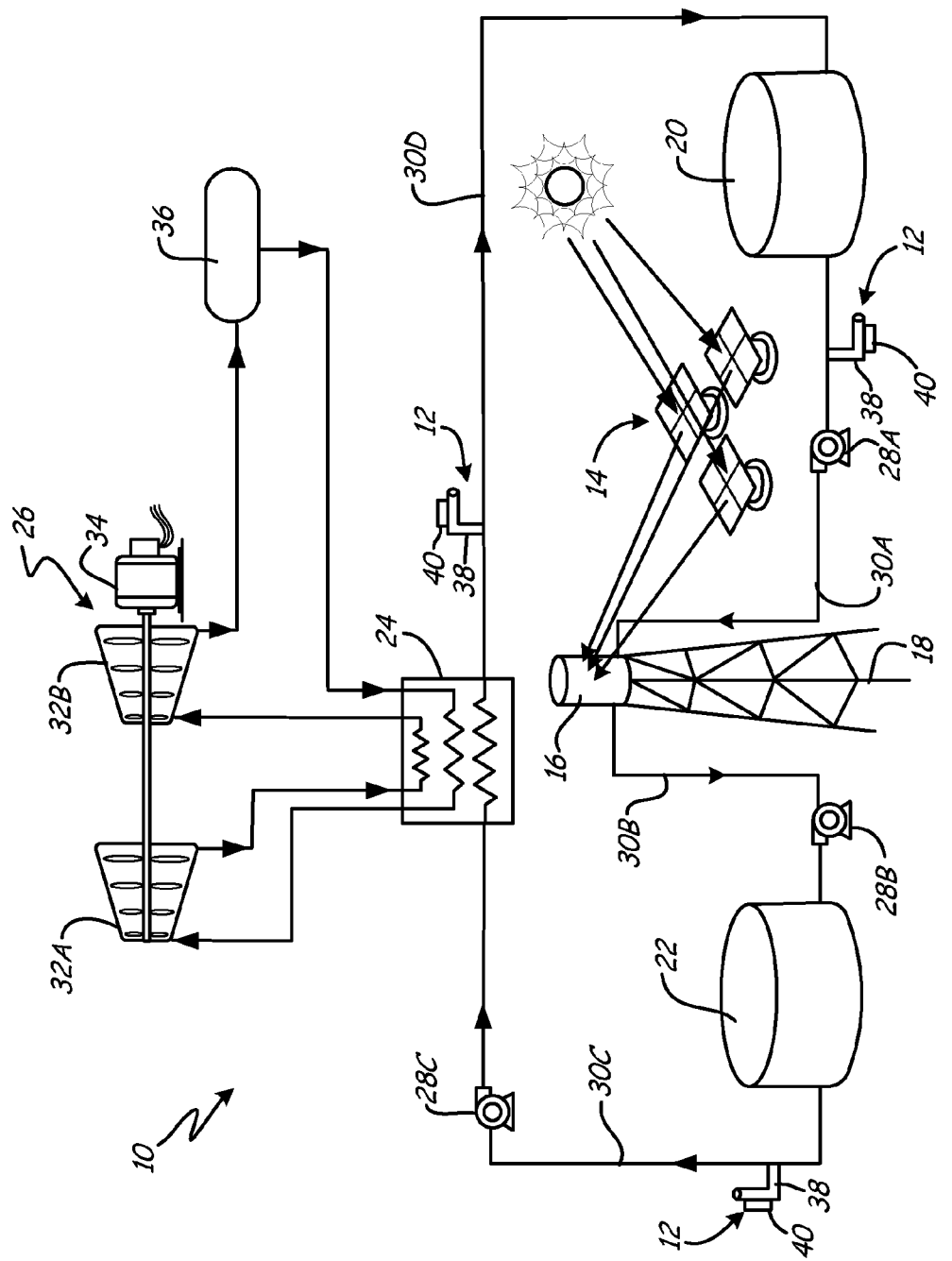
FIG. 1 shows a schematic diagram of a concentrated solar power generation system having an air quality instrumentation system of the present invention.

FIG. 1 shows a schematic diagram of concentrated solar power generation system 10 having air quality instrumentation systems 12 of the present invention. In the embodiment shown, system 10 comprises a power tower system having solar collector system 14, central receiver 16, tower 18, cold storage tank 20, hot storage tank 22, heat exchanger 24, generator 26, pumps 28A, 28B and 28C, and pipes 30A, 30B, 30C and 30D. In other embodiments, system 10 may comprise a beam down solar power generation system or a parabolic trough solar power generation system. Solar collector system 14 and central receiver 16 impart heat from the sun into a molten heat transfer medium contained in storage tanks 20 and 22 such that thermal energy can be converted to electrical energy using heat exchanger 24 and conversion system 26. Air quality instrumentation systems 12 analyze content of system air within pipes 30A-30D that connect the various components of system 10 so that the presence of harmful gases within pipes 30A-30D can be identified.

Solar collector system 14 comprises an array of sun-tracking mirrors, or heliostats, that concentrate solar rays at central receiver 16 to heat a heat transfer medium located within pipes 30A-30D. In one embodiment, approximately 8,500 heliostats, having surface areas of about 42 $m^2$ (square meters) to about 150 $m^2$, are arranged concentrically around a tower, having a height of approximately 170 meters, to cover an area of approximately 1 to 2 square mile (~2.59 to 5.18 square kilometers). The heat transfer medium typically comprises molten salt that is maintained in a molten state between approximately 500° F. (~260.0° C.) and 1200° F. (~648.9° C.) such that it remains liquid. Through pipe 30A, pump 28A directs cool heat transfer medium from cold storage tank 20 into a plurality of tubes within central receiver 16 whereby heat from the concentrated solar rays is imparted into the heat transfer medium. Through pipe 30B, pump 28B directs the heated heat transfer medium from receiver 16 to hot storage tank 22 where it is stored in a state ready for producing power with heat exchanger 24. When power is desired to be produced, heated heat transfer medium is routed through pipe 30C by pump 28C from hot storage tank 22 to heat exchanger 24 where heat is input into conversion system 26. Conversion system 26 may comprise any conventional system that converts thermal energy to mechanical energy, such as Brayton cycle or Rankine cycle systems. In the embodiment shown, conversion system 26 comprises a steam turbine generator having first stage expander 32A, second stage expander 32B, generator 34 and condenser 36. Water within heat exchanger 24 is heated by the molten heat transfer medium to produce steam that turns first and second stage expanders 32A and 32B. Expanders 32A and 32B rotate a shaft to drive generator 34 to convert mechanical energy to electrical energy. Heat exchanger 24 therefore removes heat from the heat transfer medium before the heat transfer medium is returned to cold storage tank 20 through pipe 30D.

The use of a heat transfer medium such as molten salt allows system 10 to efficiently store thermal energy in salt contained in hot storage tank 22 such that electrical power can be generated at times when solar collector system 14 is operating below peak. Thus, system 10 can be run 24 hours a day at low power production or at higher production levels for shorter intervals. In various embodiments, the molten salt can be salts composed of alkaline earth fluorides and alkali metal fluorides, and combinations thereof Suitable elements of the molten salt include: Lithium (Li), Sodium (Na), Potassium (K), Rubidium (Rb), Cesium (Cs), Francium (Fr), Beryllium (Be), Magnesium (Mg), Calcium (Ca), Strontium (Sr), Barium (Ba), Radium (Ra), and Fluorine (F). Examples of suitable fluoride molten salts include, but are not limited to: FLiNaK, FLiBe, FLiNaBe, FLiKBe, and combinations thereof, as is described in greater detail in U.S. Pat. App. No. 2008/0000231 to Litwin et al. Salts, however, need to be maintained at elevated temperatures to remain in a molten state such that the salt can flow between components of system 10 using pipes 30A-30D and pumps 28A-28C. Thus, it is necessary to provide various trace heating systems throughout system 10, such as at pipes 30A-30D and tanks 20 and 22, to maintain the salt at elevated temperatures. Heating of the salt produces various particles and gases such as nitrous oxides (NOx) and water ($H_2O$), that are released into pipes 30A-30D and ultimately to the atmosphere.

Air quality instrumentation systems 12 are connected to pipes 30A, 30C and 30D to monitor air flowing throughout system 10. Specifically, air quality instrumentation systems 12 include vent pipes 38 and spectroscopes 40 to detect the quantity of harmful constituents within the system air of system 10. Typically, the heat transfer medium is routed through pipes 30A-30D at pressures between 100 pounds per square inch (psi) (~689.5 kPa) and 200 psi (~1379.0) to, for example, transport the heat transfer medium up to receiver 16. Vent pipes 38 open system 10 to atmospheric pressure and permit air to enter system 10 during various operations. During various maintenance operations and daily shutdown of receiver 16, the heat transfer medium needs to be pumped out of system 10 and vent pipes 38 permit atmospheric air to enter system 10 to equalize pressure within system 10 with atmospheric pressure. The introduction of outside air into system 10, however, also introduces gases and particles from the surrounding environment into system 10. The presence of particulate and gaseous byproducts and foreign gases and particles within system 10 can, however, cause corrosion and cracking of pipes 30A-30D. In particular, chlorides released from the salt and found in atmospheric air can react with moisture within system 10 to cause chloride stress corrosion cracking of components of system 10, such as pipes 30A-30D and tanks 20 and 22. Furthermore, nitrous oxides produced by heating of salt-based heat transfer mediums are pollutants that are harmful to atmospheric air. Pipes 30A-30D are, therefore, provided with air quality instrumentation systems 12 to monitor the composition of air within system 10 such that subsequent corrective or preventative measures can be taken. For example, the presence of excess chlorides within the system air indicates that a problem with chloride stress corrosion cracking may exist if there is excess moisture within pipes 30A-30D. Thus, further analysis of system air can be performed to check for moisture content within system 10. If excess moisture is detected, subsequent procedures can be taken to dry air within system 10 to remove moisture, thereby reducing the risk of chloride stress corrosion cracking and other damage. For example, desiccant-based drying systems can be used as is described in the related application entitled "AIR DRYING SYSTEM FOR CONCENTRATED SOLAR POWER GENERATION SYSTEMS" by inventors A. Zillmer and D. Cap. Also, the content of nitrous oxides within the system air can be monitored to check performance of salt-based heat transfer mediums or to provide data for governmental air emissions quality regulations. Any number of air quality instrumentation systems 12 may be used as is necessary to properly analyze air within system 10. For example, an air quality instrumentation system 12 can be implemented at each vent point within system 12.

Figure 2:
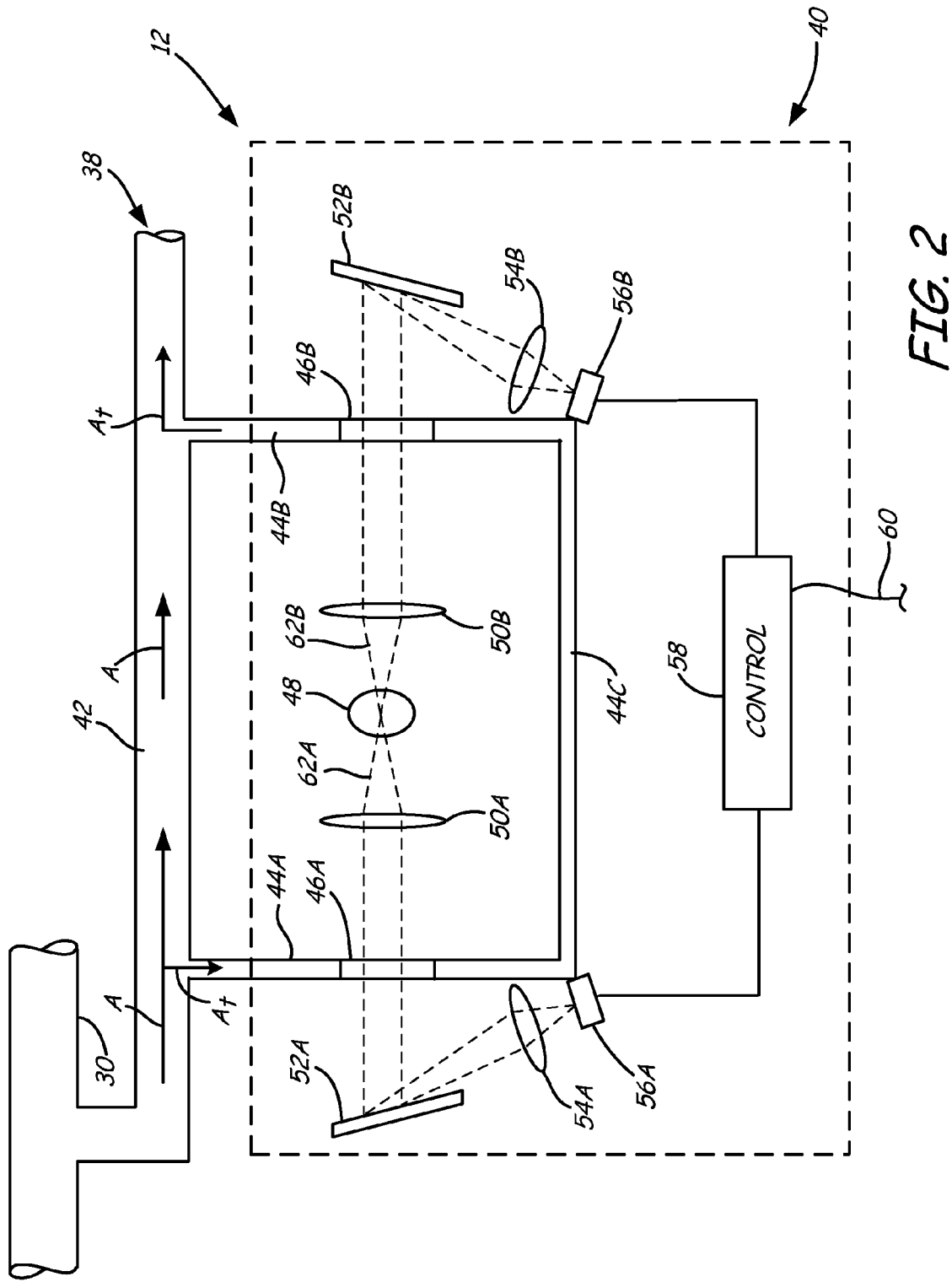
FIG. 2 is a schematic diagram of a first embodiment of an air quality instrumentation system for use in the concentrated solar power generation system of FIG. 1.

FIG. 2 is a schematic diagram of a first embodiment of air quality instrumentation system 12 for use in solar power generation system 10 of FIG. 1. Air quality instrumentation system 12 is connected to pipe 30, which is representative of any heat transfer fluid pipe used in system 12, such as pipes 30A-30D. Air quality instrumentation system 12 comprises vent pipe 38 and spectroscope 40. Vent pipe 38 includes main pipe 42 and tap off lines 44A, 44B and 44C, and windows 46A and 46B. Spectroscope 40, which comprises a dual analysis system, includes light source 48, collimaters 50A and 50B, diffraction gratings 52A and 52B, collimators 54A and 54B, detectors 56A and 56B and controller 58.

System air A flows through main pipe 42, carrying with it molecules of matter from within pipe 30 and system 12. Tap off lines 44A-44C draw tap off air $A_T$ from pipe 42 such that tap off air $A_T$ can be analyzed by spectroscope 40, and return tap off air $A_T$ to pipe 42 for venting from system 12. Tap off lines 44A and 44B are parallel and disposed opposite light source 48 so that two analyses of air A can be performed. In other embodiments of the invention, tap off lines 44A-44B include additional, multiple bends arranged in view of light source 48 such that many analyses of air A can be performed. Controller 58 is connected a system-wide controller (not shown) through communication system 60, such as a wireless or wired computer network, to operate solar power generation system 10. Controller 58 operates detectors 56A and 56B to determine the presence of constituents within system air A. The intensity of wavelengths for light beams 62A and 62B of light source 48 are measured before and after passing through air $A_T$ and correlated to absorption lines of materials that absorb photons of light for specific wavelengths. Thus, spectroscope 40 utilizes absorption spectroscopy or spectrography techniques known in the art to identify molecules within air A.

Light source 48 emits light beams 62A and 62B from a common source such that diffuse, expanding waves of light are projected toward collimators 50A and 50B. Light source 48 comprises any suitable light source. In one embodiment, light source 48 comprises an incandescent light bulb that emits a full spectrum of light. In other embodiments, light source 48 emits a narrower band of wavelengths that correspond to the absorption lines of molecules of matter within air A that is of interest. For example, in one embodiment light source 48 comprises a sodium vapor lamp. In various embodiments, light source 48 emits diverging waves of light.

Collimators 50A and 50B decrease the divergence of the waves comprising light beams 62A and 62B such that the beams are collimated. For example, collimators 50A and 50B may comprise either lenses or mirrors that refract or reflect, respectively, light beams 62A and 62B into aligned, nearly parallel, waves of light. As such, collimated light beams 62A and 62B pass straight into windows 46A and 46B. Windows 46A and 46B are transparent to the wavelength of interest such that light beams 62A and 62B pass through unaltered. In one embodiment, each window 46A and 46B comprises a pair of windows positioned opposite each other within tap off line 44A or 44B, respectively, to permit light beams 62A and 62B to pass straight through. In other embodiments, windows 46A and 46B comprise tube-like structures spliced into lines 44A and 44B that provide a three-hundred-sixty degree view into lines 44A and 44B.

The collimated light beams 62A and 62B are passed through windows 46A and 46B, respectively. While passing through windows 46A and 46B, collimated light beams 62A and 62B are attenuated by the presence of various molecules within air A that absorb light at wavelengths specific to each molecule. Each molecule absorbs photons of light at specific wavelengths based on its chemical makeup, as is known in the art or as can be empirically determined. The absorption of these wavelengths produces absorption lines within the wavelengths of light beams 62A and 62B. The absorption lines comprise darkened bands within the spectrum of light produced by beams 62A and 62B. The combination of the absorption lines produced by each molecule provides a signature or fingerprint of the presence of that molecule within air A. For example, chlorides, nitrogen oxides, and water each absorb different wavelengths because of their varying compositions of matter, and thus produce a different absorption line signature. Thus, spectroscope 40 can be configured to detect molecules that are of interest to system 12, such as chlorides, nitrogen oxides or water vapor.

After passing through windows 46A and 46B, collimated light beams 62A and 62B are incident on diffraction gratings 52A and 52B, respectively. Collimators 50A and 50B evenly illuminate diffraction gratings 52A and 52B with collimated beams 62A and 62B. Diffraction gratings 50A and 50B split collimated beams 62A and 62B into multiple beams traveling in different directions such that the light is dispersed. The dispersion of the light is dependent on the wavelength of the light received by diffraction gratings 50A and 50B, as well as by the size of spacings within gratings 50A and 50B. Diffraction gratings 50A and 50B are selected such that they have spacing that corresponds to a wavelength range for the molecules of matter within air A that is to be detected. Dispersed light beams 62A and 62B are thus split into beams of light across specific wavelength bands and reflected toward collimators 54A and 54B, respectively.

Collimators 54A and 54B again collimate light beams 62A and 62B such that nearly parallel rays of light in the specified wavelength range are directed toward detectors 56A and 56B. Detectors 56A and 56B comprise devices, such as a charge coupled device (CCD), that count photons at specified wavelengths. In other embodiments of the invention, collimators 54A and 54B may be omitted and larger sized detectors may be used. Thus, for wavelengths presented to detectors 56A and 56B by diffraction gratings 52A and 52B, intensities of those wavelengths are determined. The intensities of those wavelengths are attenuated by presence of specific molecules within air A, which absorb wavelengths corresponding to their signature absorption lines. The amount of absorbance ($-\log(I/I_0)$) is proportional to the molar concentration of the absorbing molecules and the thickness of air A within lines 44A and 44B, according to the Beer-Lambert law. Thus, by identifying the signature absorption lines for the absorbing molecules, and determining a change in intensity at the wavelengths for each absorption line in the signature, the concentration of the molecule can be determined. Detectors 56A and 56B measure reduced or attenuated levels at the wavelengths absorbed by molecules in air A. The magnitude of each attenuated wavelength can be compared to control wavelength magnitude for air A having acceptable levels or and absence of each molecule. Using controller 58, a graphical output of the intensities of each wavelength can be generated. For example, a chart plotting the wavelength band of diffraction gratings 52A and 52B along an X-axis and the intensity of each wavelength along a Y-axis can be generated such that operators of system 10 can have a visual representation of the makeup of air A along the specified wavelength band. Thus, comparisons of the intensity at signature absorption bands can be made for light beams 62A and 62B that have passed through air $A_T$ with intensities at signature absorption bands for control light beams.

Spectroscope 40 is configured to monitor for specific compositions that are of interest in operation system 10. For example, spectroscope 40 can be configured to monitor for compositions that may be harmful to system 10, such as compositions that indicate that the heat transfer medium has undergone an adverse reaction. Additionally, water content within system 12 can be monitored to detect for the potential of corrosion and as an indication of poorly functioning or faulty seals within system 12. Also, spectroscope 40 can be configured to monitor for emissions of system 10 that are harmful to the environment, such as nitrogen oxides, so that compliance with governmental regulations can be met. Spectroscope 40 is configured by first selecting diffraction gratings 52A and 52B that will produce dispersion of light beams 62A and 62B over wavelength bands that will envelope the wavelength of a specific composition that is to be monitored for. Diffraction grating 52A and 52B can be selected to monitor for different bands such that two compositions can be readily identified using only a single light source. Additionally, detectors 56A and 56B can be selected such that they are configured to detect wavelengths within the band presented by diffraction gratings 52A and 52B, such that the area of interest is more easily identifiable, rather than detecting the entire light spectrum. Furthermore, light source 48 can be selected to produce light nearer the wavelength band of interest. Diffraction gratings 52A and 52B, detectors 56A and 56B and light source 48 can be swapped out of spectroscope 40 to monitor for different compositions. Additionally, the plurality of instrumentation systems 12 within system 10 can be configured to monitor for different compositions.

As such, instrumentation system 12 provides a simple to use and flexible monitoring system that provides a means for detecting the presence of various compositions within air inside of solar power generation system 10. The presence of the compositions can be used to monitor operation of system 10, measure emissions of system 10 and as an indication of when maintenance needs to be performed. Thus, the overall health of system 10 can be monitored by analyzing the composition of air A.

For example, in one embodiment of the invention, spectroscope 40 is configured to monitor molecules that may produce specific corrosion reactions, such chlorides that produce chloride stress corrosion cracking. Stress corrosion cracking is a common mode of failure in many stainless steels, which are typically used within system 10 to withstand water corrosion and the high salt environment. Stress corrosion cracking, which can form with little or no warning, occurs when a material is subjected to a loading, either from residual stresses or operating stresses, and is exposed to a catalyst, such as chlorides. Chloride stress corrosion cracking causes stainless steels, which are typically tough and ductile, to become brittle and rapidly crack under loading at levels much less than the steels are designed to withstand. Chloride stress corrosion cracking, however, can be initiated and sustained after only brief exposure to low levels of a chloride catalyst. Thus, chloride stress corrosion cracking is more easily controlled by limiting the moisture within system 10. The present invention provides a means for monitoring water and chloride content within system 12 to that preventative measures can be taken to reduce the risk of chloride corrosion cracking. For example, in various embodiments of system 10, vent pipes 38 can be fitted with an air drying systems, as is described in the related application entitled "AIR DRYING SYSTEM FOR CONCENTRATED SOLAR POWER GENERATION SYSTEMS" by inventors A. Zillmer and A. Cap, to reduce moisture content within air A.

Vent pipes 38 provides an inlet into system 10 at which air A can be accessed, and thus provides a position at which spectroscope 40 can be mounted to system 10. Heat transfer medium disposed within system 10 reaches elevated temperatures that are capable of interfering with operation of spectroscope 10. For example, molten salt maintained within pipe 30 must be maintained above approximately 500° F. (~260.0° C.) to remain in a molten state. Such temperatures are capable of warping optics within spectroscope 40, damaging electrical components such as detectors 56A and 56B, as well as interfering with light transmission within spectroscope 40. Vent pipe 38, however, extends away from pipe 30 far enough to where temperatures are safe for operation of spectroscope 40. In the embodiment of FIG. 2, vent pipe 38 comprises a large diameter pipe that vents atmospheric air into and out of pipe 30. Pipe 30 can have various diameters, depending on the capacity of system 12 and the desired venting capacity needed at pipe 30. Furthermore, the diameter of pipe 30 depends on other factors, such as the number of venting systems used. In order to analyze tap off air $A_T$, it is necessary to pass light beam 58 through a pair of windows, such as windows 40A and 42A. For large diameter pipes such as pipe 30, light beam 58 becomes too diffuse to pass through both windows. As such tap off lines 44A-44B are affixed to main pipe 42. Tap off line 44A bleeds a small volume of tap off air $A_T$ from air A in main pipe 42, which is later returned to main pipe 42 at line 44B after passing through line 44C. Tap off lines 44A-44C comprise small diameter pipes through which light beams 62A and 62B will easily pass without adverse levels of diffusion. Light source 48 and diffraction gratings 52A and 52B can thus be appropriately positioned adjacent windows 46A and 46B to analyze tap off air $A_T$. Spectroscope 40 can also be attached to pipe 30 through other configurations of vent pipe 38.

Figure 3:
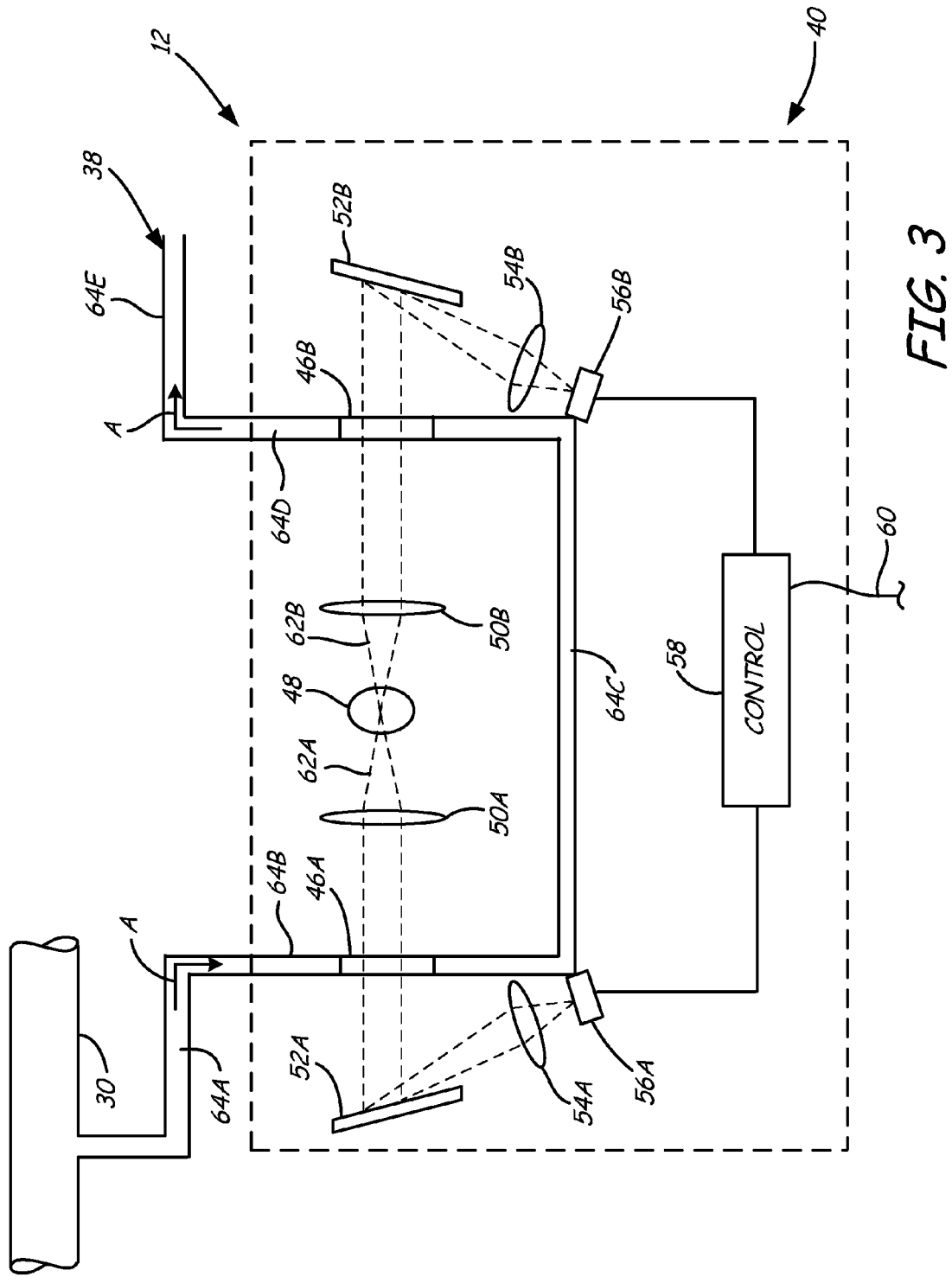
FIG. 3 is a schematic diagram of a second embodiment of an air quality instrumentation system for use in the concentrated solar power generation system of FIG. 1.

FIG. 3 is a schematic diagram of a second embodiment of air quality instrumentation system 12 for use in solar power generation system 10 of FIG. 1. Air quality instrumentation system 12 is connected to pipe 30, which is representative of any heat transfer fluid pipe used in system 12, such as pipes 30A-30D. Air quality instrumentation system 12 comprises vent pipe 38 and spectroscope 40. Vent pipe 38 is connected to pipe 30 to vent air from system 10, as does vent pipe 38 of FIG. 2. Spectroscope 40 includes similar components as spectroscope 40 of FIG. 2, with like elements comprising like reference numerals. Spectroscope 40 of FIG. 3, thus, functions equivalently as spectroscope 40 of FIG. 2.

Vent pipe 38 includes a bend or kink, formed by pipes 64A-64E, such that spectroscope 40 can be directly coupled to vent pipe 38. Pipes 64A-64E conduct the full volume of system air A through spectroscope 40, such that no tap off lines are needed. Pipes 64A-64E are arranged to have two sections through which light from light source 48 can be simultaneously passed so that multiple analyses of air A con be performed. For example, pipes 64B and 64D are parallel so that light beams 62A and 62B can pass straight through windows 46A and 46B and on to diffraction gratings 52A and 52B, respectively. Pipes 64A-64E comprise small diameter pipes through which light beams 62A and 62B of light source 48 will easily pass without adverse levels of diffusion. Thus, air instrumentation system 12 of FIGS. 2 and 3 provide simple to use and flexible monitoring systems that provide means for detecting the presence of various compositions within air inside of solar power generation system 10.

Although the present invention has been described with reference to preferred embodiments, workers skilled in the art will recognize that changes may be made in form and detail without departing from the spirit and scope of the invention.

The invention claimed is:

1. An air quality instrumentation system for a concentrated solar power generation system using a fluid heat transfer medium, the air quality instrumentation system comprising:
   a pipe extending from the concentrated solar power generation system, the pipe containing system air from within the concentrated solar power generation system;
   a window positioned within the pipe to permit light to pass through the pipe and the system air; and
   a spectroscope positioned adjacent the window to assess concentration of a constituent within the system air, the concentration of the constituent providing an indication of an operating condition within the concentrated solar power generation system.

2. The air quality instrumentation system of claim 1 wherein the pipe comprises a vent pipe having:
   a first end connected to a fluid heat transfer medium housing; and
   a second end opened to atmospheric air;
   wherein the window is positioned between the first end and the second openings.

3. The air quality instrumentation system of claim 1 wherein the pipe includes a tap off line extending from the pipe, the tap off line having first and second openings connected to the pipe, wherein the window is positioned on the tap off line between the first end and the second end.

4. The air quality instrumentation system of claim 2 wherein the spectroscope comprises:
   a source for producing an analyzing light;
   a first collimator positioned between the source and the window to receive the analyzing light and produce a first collimated beam;
   a first diffraction grating positioned adjacent the window opposite the first collimator to receive the first collimated beam after passing through the window and the system air, the first diffraction grating producing a first diffracted beam for a first wavelength band; and
   a first detector positioned to receive the first diffracted beam to produce an output representative of a magnitude of the first wavelength band.

5. The air quality instrumentation system of claim 4 and further comprising a second collimator positioned between the first diffraction grating and the first detector to focus the first diffracted beam on the first detector.

6. The air quality instrumentation system of claim 5 and further comprising a controller to measure the first wavelength band at the first detector.

7. The air quality instrumentation system of claim 4 wherein the pipe includes multiple bends and a plurality of windows arranged such that the analyzing light passes through the plurality of windows.

8. The air quality instrumentation system of claim 7 and further comprising:
   a third collimator positioned between the source and one of the plurality of windows to receive the analyzing light and produce a second collimated beam;
   a second diffraction grating positioned adjacent the window opposite the second collimator to receive the second collimated beam after passing through the window and the system air, the second diffraction grating producing a second diffracted beam for a second wavelength band;

a second detector positioned to receive the second diffracted beam to produce an output representative of a magnitude of the second wavelength band; and a fourth collimator positioned between the second diffraction grating and the second detector to focus the second diffracted beam on the second detector.

9. The air quality instrumentation system of claim 8 wherein:

the heat transfer medium comprises a molten salt;
the constituent includes nitrogen oxides, chlorides or water vapor;
the first wavelength band corresponds to a spectrum for the nitrogen oxides, the chlorides or the water vapor;
the second wavelength band corresponds to a spectrum for the nitrogen oxides, the chlorides or the water vapor; and
the operating condition includes at least one of an assessment of emissions output and an assessment of chloride stress corrosion cracking risk.

10. The air quality instrumentation system of claim 1 wherein the constituent comprises water and the operating condition include a leaking seal.

11. The air quality instrumentation system of claim 1 wherein the constituent comprises chlorides and the operating condition comprises chloride stress corrosion cracking.

12. The air quality instrumentation system of claim 1 wherein the constituent comprises nitrogen oxides and the operating condition comprises emissions output.

13. A solar power generation system comprising:
a fluid housing;
a heat transfer fluid within the fluid housing;
a solar collector for concentrating solar energy onto the heat transfer medium; and
an air quality instrumentation system connected to the fluid housing, the air quality instrumentation system comprising:
 a gas pipe extending from the fluid housing, the gas pipe containing system air from the concentrated solar power generation system;
 a window positioned within the gas pipe to permit light to pass through the system air; and
 a spectroscope positioned adjacent the window to assess concentration of a constituent within the system air within the gas pipe, the concentration of the constituent providing an indication of an operating condition within the concentrated solar power generation system.

14. The solar power generation system of claim 13 wherein the solar collector comprises a trough disposed adjacent a length of heat transfer medium pipe connected to the fluid housing.

15. The solar power generation system of claim 13 wherein the solar collector comprises an array of heliostats focused on heat transfer medium piping connected to the fluid housing.

16. The solar power generation system of claim 13 wherein the fluid housing comprises a heat transfer medium pipe, and the gas pipe comprises a ventilation pipe having:
a first end connected to the fluid housing; and
a second end open to atmospheric air;
wherein the window is positioned between the first end and the second.

17. The solar power generation system of claim 13 wherein the gas pipe includes a tap off line, the tap off line having first and second openings connected to the gas pipe, wherein the window is positioned between the first end and the second openings.

18. The solar power generation system of claim 13 wherein the spectroscope comprises:
a source for producing an analyzing light;
a first collimator positioned between the source and the window to receive the analyzing light and produce a first collimated beam;
a first diffraction grating positioned adjacent the window opposite the first collimator to receive the first collimated beam after passing through the window and the system air, the first diffraction grating producing a first diffracted beam for a first wavelength band;
a first detector positioned to receive the first diffracted beam to produce an output representative of a magnitude of the first wavelength band; and
a controller to measure the first wavelength band at the first detector.

19. The solar power generation system of claim 18 wherein:
the heat transfer medium comprises a molten salt;
the air includes nitrogen oxides, chlorides and water vapor; and
the first wavelength corresponds to a spectrum for nitrogen oxides, to a spectrum for chlorides, or to a spectrum for water vapor.

20. A method for taking corrective action in a solar power generation system, the method comprising:
generating a source of analyzing light;
collimating the analyzing light into a collimated beam;
directing the collimated beam into a pipe through a window behind which flows a gas from a solar power generation system, the gas having a known constituent;
diffracting the collimated beam using a diffraction grating having a wavelength band associated with the known constituent to produce a diffracted beam;
receiving the diffracted beam at a detector to produce an attenuated wavelength band having spectral indicia of a concentration of the known constituent; and
adjusting a condition of the solar power generation system based on the concentration of the known constituent.

* * * * *